Feb. 6, 1951 W. D. HOUGHTON 2,540,524

ELECTRICAL COUNTER CIRCUIT

Filed July 27, 1945

INVENTOR.
William D. Houghton
BY H. S. Grover
ATTORNEY.

Patented Feb. 6, 1951

2,540,524

UNITED STATES PATENT OFFICE 2,540,524

ELECTRICAL COUNTER CIRCUIT

William D. Houghton, Port Jefferson, N. Y., assignor to Radio Corporation of America, a corporation of Delaware Application July 27, 1945, Serial No. 607,296

6 Claims. (Cl. 250—27)

This invention relates to an electrical counter circuit.

An object of the invention is to provide an improved circuit for generating a step wave voltage having a plurality of steps or risers corresponding in number to a desired number of applied input waves.

Another object of the invention is to provide a stable counter circuit for generating a pulse which is a submultiple of the frequency of an applied alternating current wave.

A further object is to provide an electrical counter circuit which generates an output wave of a frequency which is lower than but a function of a higher frequency input wave.

The counter circuit of the invention has numerous applications in electrical circuits. By way of illustration, the invention may be used in a pulse type multiplex communication system for producing a step wave voltage and also to produce an output pulse which has a submultiple frequency relation to an input wave; or the counter of the invention may be used as a frequency divider of applied input waves whether these applied input waves are of square wave or triangular wave character. When used in a pulse type multiplex system, the different steps or risers in the step wave voltage may control different channel selector circuits.

Figure 1:
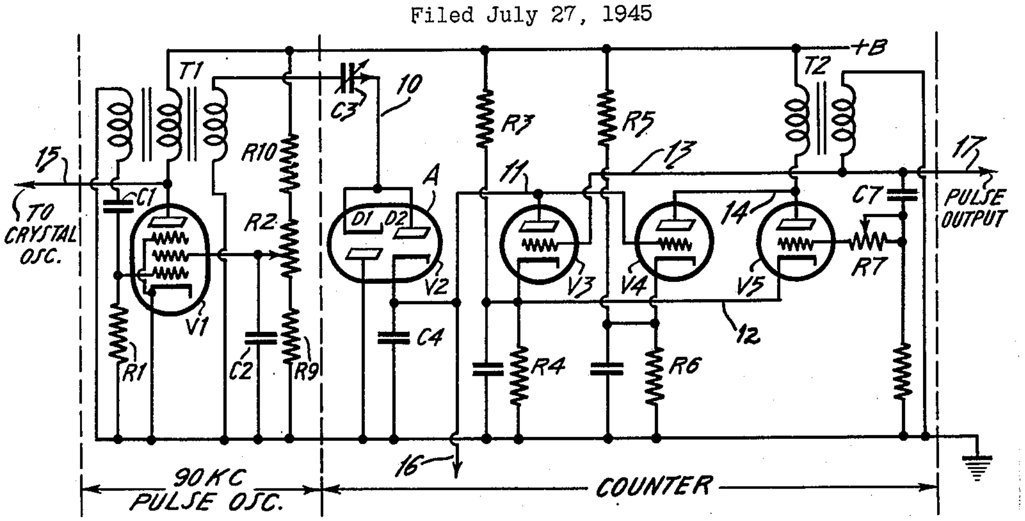

A more detailed description of the invention follows, in conjunction with a drawing, wherein:

Fig. 1 illustrates one application of the counter circuit of the invention; and

Figures 2A, 2B, 2C:
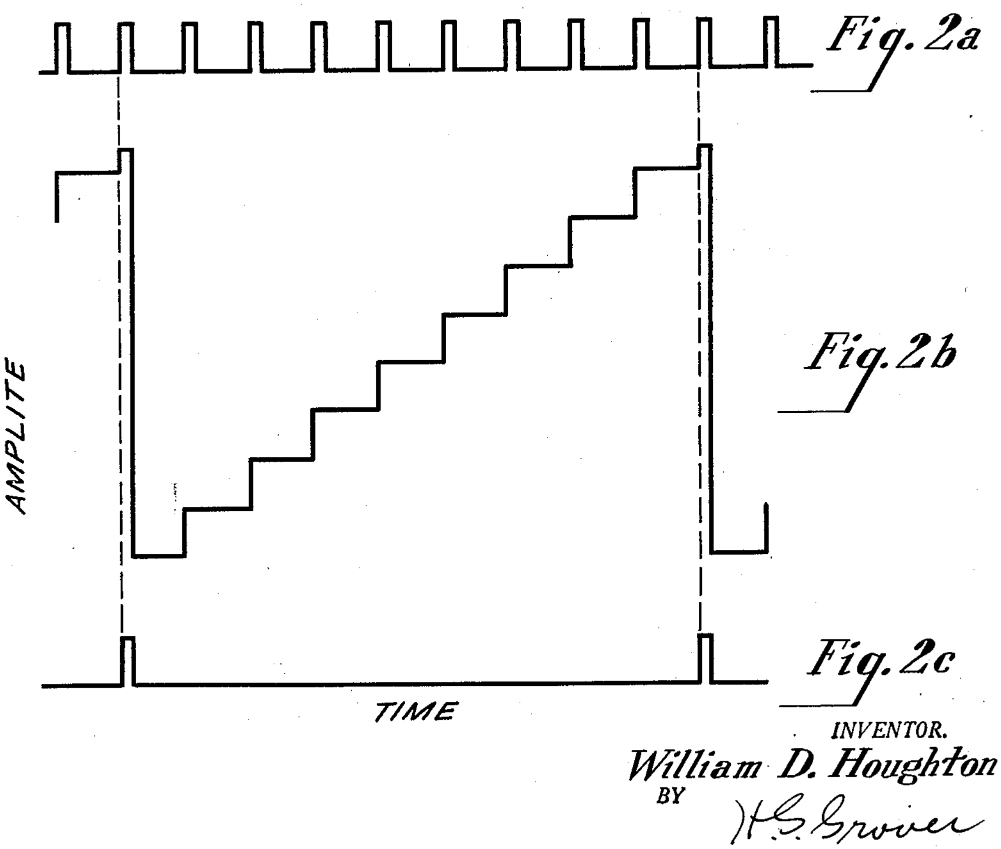

Figs. 2*a*, 2*b* and 2*c* are voltage wave forms occurring at different points of the counter circuit, given to more clearly explain the operation of the invention.

The counter of the invention is appropriately labeled in Fig. 1 as including the apparatus between two vertical dash lines, and includes a double diode A, three triode vacuum tubes V3, V4 and V5, and associated circuit elements. Tube V5 together with transformer T2 forms a tripping oscillator. The three vacuum tubes V3, V4 and V5 are normally non-conductive; that is, they are biased to the anode current cut-off condition. The cathodes of tubes V3 and V4 are respectively connected to the positive terminal +B of a source of direct current potential through individual resistors R3 and R5. The anodes of tubes V4 and V5 are connected together via lead 14 and connected to +B through one winding of transformer T2. Double diode A includes two diode sections D1 and D2. Although the two diodes are shown within a single evacuated envelope, it will be understood that, if desired, two separate diode tubes can be used instead of a single double diode tube. The cathode of section D1 is directly connected to the anode of D2 and both of these electrodes are connected to a condenser C3 through lead 10. The anode of diode section D1 is grounded, while the cathode of diode section D2 is connected to condenser C4 across which the step wave voltage is developed. Condenser C3 is appreciably smaller in size than condenser C4 and these condensers may have a relation, for example, of $$\frac{C3}{C4}=\frac{1}{20}$$

depending upon the number of steps or risers desired in the output step wave voltage.

The cathode of diode D2 is also connected to the grid of triode vacuum tube V4 via lead 11, as a result of which tube V4 will conduct when the voltage built up on condenser C4 equals or exceeds the cut-off potential value of tube V4.

It should be noted that the cathodes of tubes V3 and V5 are connected together by means of lead 12 and have a common cathode resistor R4.

The grid of tube V3 is connected via lead 13 to the secondary winding of transformer T2, as a result of which the tube V3 receives a pulse from the tripping oscillator when it fires, of such magnitude as to overcome the cut-off bias on tube V3 and cause this tube to conduct. When tube V3 conducts, it forms a low impedance path across condenser C4 to enable this condenser to discharge through the space path of this tube.

There are two outputs obtainable from the counter circuit of the invention. One output is taken from lead 16 and comprises a step wave voltage having a desired number of steps or risers. The other output is taken from lead 17 and comprises a pulse whose frequency is a submultiple of the applied input waves. The appearance of these two outputs is shown in Figs. 2*b* and 2*c*. Fig. 2*b* shows the step wave voltage taken from lead 16. Fig. 2*c* shows the pulse voltage taken from lead 17. Fig. 2*a* shows the pulse input to condenser C3 of the counter circuit. The positions of Figs. 2*a*, 2*b* and 2*c* above one another fairly accurately represent the timing relations of these wave forms.

In order to supply recurring input waves to the counter, there is provided a pulse oscillator which is appropriately labeled in the drawing. This oscillator is a conventional blocking oscillator which generates pulses. By way of example only and for the purpose of this description, let it be assumed that these pulses are each about 1 μsec. (microsecond) long at a 90 kc. rate. Obviously, the invention is not limited to this particular pulse oscillator or this pulse frequency or this particular pulse duration and the pulse oscillator can have a different frequency and a different pulse duration. Its frequency of operation is determined by the values of condenser C1 and resistor R1. This pulse oscillator includes a pentode vacuum tube V1 and a three winding, tightly coupled transformer T1. The three series connected resistors R10, R2 and R9 comprise a bleeder circuit between the positive terminal +B of the direct current potential source and ground. The screen grid of oscillator tube V1 is connected to resistor R2 by means of a tap, as shown. Output from the pulse oscillator is fed from one of the windings of transformer T1 to condenser C3 in the counter circuit.

In the particular system shown in the drawing, which was satisfactorily tried out in practice in a pulse type multiplex communication system, the 90 kc. pulse oscillator was synchronized by a constant source of 90 kc. frequency oscillations. This is accomplished by means of lead 15 connecting the anode of the pulse oscillator to a crystal oscillator, not shown, which produces pulses of current at a 90 kc. rate. In practice, the values of R1 and C1 of the 90 kc. pulse oscillator are so chosen that the frequency of this pulse oscillator is slightly lower than the synchronizing voltage applied to lead 15 by the crystal oscillator.

An explanation of the operation of the counter circuit of the invention will now be given. Let it be assumed, for example, that it is desired to obtain from the counter an output pulse from lead 17 which is one-ninth (1/9) the frequency of the 90 kc. pulse oscillator, and also to obtain a step wave from output lead 16 which has nine steps or risers. These nine steps or risers may be used to control eight channels in a multiplex system while the ninth interval may be used for synchronizing purposes. Obviously, the counter of the invention may be employed wherever there is need for either one or both of these output waves. Let it also be assumed that the ratio of the values of condensers C3 and C4 is 1 to 20.

On the positive rising edge (leading or starting edge, for example) of the pulse applied by the 90 kc. pulse oscillator to condenser C3 in the counter circuit, diode D1 will not conduct, though diode D2 will conduct, as a result of which the circuit will look as though the two condensers C3 and C4 are in series relative to ground. Hence, one-twentieth of the total input voltage appears across condenser C4, producing an incremental increase in the voltage on condenser C4. This incremental increase on condenser C4 is equivalent to a step or rise whose amplitude is given by the formula $$ES=(EP-EK)\frac{C3}{C3+C4}$$

where ES is the amplitude of the rise or step of voltage, EP is the pulse amplitude and EK is the voltage across condenser C4 at the time of the pulse EP. On the negative falling edge (trailing edge, for example) of the pulse supplied to condenser C3 by the pulse generator, diode D1 will conduct and discharge condenser C3, but diode D2 will not conduct, thus leaving unchanged the voltage on condenser C4 acquired during the immediately preceding positive rise of the pulse. The voltage on condenser C3 will be completely discharged to ground through diode D1 during this negative drop, or putting it in other words, the negative going edge of the pulses from the pulse oscillator is shorted to ground through diode D1. During the next positive rise in voltage caused by the succeeding pulse applied to condenser C3, the condenser C3 will be recharged through diode D2. It will thus be seen that each time there is a positive rise in voltage applied to condenser C3 by the pulse generator, there will be an incremental increase or step-up in voltage on condenser C4 although each charge on condenser C4 after the first is slightly less than the preceding one, due to the fact that EK, in the formula $$ES=(EP-EK)\frac{C3}{C3+C4}$$

increases with each step in the stair, and since the 90 kc. pulse input remains constant, ES in the above formula must decrease with each step in the stair. At this time it should be noted that there is no resistance whatever across condenser C4, in order to avoid any current or leakage charge during the voltage step-up operation.

Assuming that the voltage of the pulse applied by the 90 kc. pulse oscillator to condenser C3 has an amplitude of 400 volts, and taking into account the previous assumption that the ratio of condenser C3 to C4 is 1:20, the voltage on condenser C4 will be increased by about 20 volts on the first step, and slightly less than 20 volts for the next step or rise. As mentioned before, each succeeding step or incremental increase in voltage on condenser C4 will be less than the preceding one. When the step wave across condenser C4 reaches the cut-off potential of normally non-conducting tube V4, anode current will flow in tube V4 through transformer T2, causing the tripping oscillator consisting of vacuum tube V5 and transformer T2 to fire. The cut-off potential of vacuum tube V4 is controlled by the values of resistor R5 and R6.

If the circuit elements associated with vacuum tube V4 are so designed that the bias on the cathode of vacuum tube V4 is +165 volts, which was an actual case in one application of the system of the invention to a pulse type multiplex system, it will be evident that the voltage across C4 must exceed approximately +155 volts before tube V4 conducts. The building up of a charge on condenser C4 on the 9th rise to about 155 volts will cause tube V4 to start conducting very suddenly, as a result of which a pulse of current is passed through transformer T2, whose windings are so poled that it applies a sharp positive pulse to the grid of tube V5, thus causing tube V5 to conduct suddenly. The sudden conduction or firing of the tripping oscillator comprising vacuum tube V5 causes a sharp positive pulse to be applied to the grid of normally nonconducting tube V3 over lead 13, thus causing tube V3 to conduct and discharge the condenser C4 through this tube. It should be noted at this time that vacuum tube V5 is an overbiased pulse oscillator and is connected regeneratively to produce only one pulse in response to the flow of current in tube V4, after which the tube V5 ceases conducting. The triggering or firing of tube V5 produces a constant amplitude discharge pulse irrespective of the amplitude of the pulse from tube V4 and this discharge pulse produced by tube V5 is utilized to cause tube V3 to conduct suddenly. When tube V3 conducts, it produces a low impedance path across the tube for the charge on condenser C4, and hence this condenser discharges through tube V3 to a relatively low value.

For the foregoing assumption and values of circuit elements, the time constants of the step generator or counter have been so designed that there are nine rises or incremental steps in voltage on condenser C4 before this condenser is discharged. The wave form of the step wave voltage is shown in Fig. 2b and is taken from output lead 16. Each time the tripping oscillator V5 fires, there is produced a pulse whose wave form is shown by curve Fig. 2c and taken from output lead 17. The pulses of Fig. 2c occur at a frequency which is one-ninth of the frequency of the applied input waves to the counter. The duration of the pulses of Fig. 2c constituting the discharge pulse generated by tripping oscillator V5 and T2 is adjustable by means of resistor R7 which is a variable resistor in the grid circuit of tube V5. When R7 is large, the time required for tube V5 to charge condenser C7 is increased, resulting in tube V5 conducting for a longer period of time and hence resulting in a long output pulse for lead 17. The cycle of operation repeats itself every nine pulses of voltage applied to the counter by the 90 kc. pulse oscillator.

In order to change the number of steps in the step wave voltage obtainable from lead 16, and hence the submultiple frequency derived from lead 17, the amplitude of each step in the step wave voltage wave form must be changed. From the above mentioned equation, $$ES=(EP-EK)\frac{C3}{C3+C4}$$

it will be seen that the amplitude of each step can be varied by varying the pulse amplitude EP derived from the 90 kc. oscillator. This may be done by varying the tap on resistor R2. The number of steps in the step wave voltage can also be changed by changing the cut-off potential value of vacuum tube V4, and this is achieved by changing the values of resistors R5 and R6. This last method of changing the number of steps in the step wave voltage would, however, change the amplitude of the complete step wave. If it is not desired to change the amplitude of the complete step wave voltage, then the number of steps can be changed by changing the amplitude of the output pulse from the 90 kc. pulse oscillator by adjusting resistor R2. When resistor R2 is at the minimum value with the screen grid tap nearest resistor R9, the count or number of steps is the highest. When resistor R2 is at the maximum value with the screen grid tap nearest resistor R10, the count or number of steps is at the lowest value. This last result can also be achieved by varying the ratio of condenser C3 to condenser C4. Either one of these condensers can be made to be adjustable, preferably condenser C3, as shown, because it is smaller in size than condenser C4. An adjustment of resistor R2 or condenser C3 in order to change the count will not appreciably change the overall step wave amplitude, although such adjustment does change the amplitude of the individual steps or risers.

An advantageous feature inherent in the counter circuit is the snap-in action, whereby the counter immediately jumps to its most favorable operating condition upon the adjustment of resistor R2 or condenser C3. As resistor R2 is adjusted to bring the count to the desired number (corresponding to the number of steps in the step wave) the count abruptly changes. If resistor R2 is now adjusted in the opposite direction, the count will not change at the same setting as it did previously, i. e., at the same resistance value of R2. This action is due to the bias voltage developed across resistor R4 which is a function of the frequency of the tripping oscillator V5, T2. Stated in other words, as the frequency of the tripping oscillator V5, T2 is changed due to changing count, the average current in tubes V3 and V5 is changed, resulting in a change of voltage across resistor R4. When tube V3 is made to conduct, it discharges the step condenser C4 to a value slightly higher than the voltage across R4. Hence, if the value of the voltage across R4 changes, then the value to which the step is discharged also changes, resulting in the counter circuit locking firmly at the position for best operation. For example, if the count is changed to a higher number requiring a longer time interval for the step wave voltage (Fig. 2b), the voltage across resistor R4 drops when the counter abruptly changes to the desired count. It should be understood that when the count changes to a higher number, the number of step risers is increased but the amplitude of each step riser is decreased, thus requiring a longer time interval for the new step wave voltage to reach the same critical value at which the tube V4 conducts, as a result of which the frequency of pulses from tripping oscillator V5, T2 is decreased to a new submultiple relation of the applied input pulses to the counter. When the pulse frequency of V5, T2 is thus decreased, the average current in V3 and V5 is decreased, resulting in a decreased voltage developing across R4. Since the conducting point of tube V4 is fixed and the amplitude of step wave voltage is also fixed, it will be seen that by reducing the voltage across R4 to a desired value, the conduction point of tube V4 on the new step wave voltage wave form can be made to take place at the middle of the new or added riser and this is a desired operating condition which is accomplished by properly proportioning the values of resistors R3 and R4 once and for all for all counts. In other words, the proper selection of resistors R3 and R4 holds true for all counts over a desired range. With this adjustment, there is avoided the possibility of unstable operation of the counter due to tolerable variations in power supply voltages (for example, anode or filament voltages). It will be seen then, that the proper operating point at the middle of a riser is automatically reached the instant the count is changed from a lower to a higher number, and this feature is herein referred to as the snap-in action.

The snap-in feature has proved to be very useful because when resistor R2 is set to the transition point as its resistance is increased, the counter immediately jumps to the condition for most favorable operation, and further adjustment is unnecessary. Therefore, in order to assure that the conducting point of tube V4 on the riser in the step wave is the same for each adjustment of resistor R2, resulting in a change in count, it is desirable to first adjust resistor R2 to give a lower count than that desired and then vary R2 upwards (move the tap on R2 toward resistor R10) until the desired count is reached.

The term "ground" used in the specification and appended claims is not limited to an earthed connection and is deemed to include any point of zero potential for D. C. and alternating current.

What is claimed is:

1. A counter circuit comprising a first condenser, a pair of rectifier structures each having a cathode and an anode, a direct connection from said condenser to the anode of one rectifier structure and the cathode of the other rectifier structure, a second condenser connected between the cathode of said one structure and ground, a direct connection from the anode of said other structure to ground, first, second and third triode vacuum tubes normally biased to cut-off, direct current connections from the anode and cathode of said first tube to opposite sides of said second condenser, whereby said first tube forms a discharge circuit for said second condenser, a connection from said second condenser to the grid of said second tube, whereby said second tube becomes conductive when the charge on said second condenser overcomes the cut-off value on said second tube, a direct connection between the cathodes of said first and third tubes, a direct connection between the anodes of said second and third tubes, a transformer having one winding connected between a source of anode polarizing potential and the anode of said third tube, and having another winding regeneratively coupled to the grid of said third tube, whereby said third tube and said transformer comprise a tripping oscillator, and a connection from said tripping oscillator to the grid of said first tube to supply to said last grid a voltage pulse of positive polarity of sufficient magnitude to cause said first tube to conduct and thereby discharge said second condenser whenever said tripping oscillator is fired.

2. A counter circuit comprising a first condenser, a pair of rectifier structures each having a cathode and an anode, a direct connection from said condenser to the anode of one rectifier structure and the cathode of the other rectifier structure, a second condenser connected between the cathode of said one structure and ground, a direct connection from the anode of said other structure to ground, first, second and third triode vacuum tubes normally biased to cut-off, a direct connection from the anode of the first tube to the cathode of said one structure, a resistor shunted by a by-pass condenser connected between ground and the cathode of said first tube, whereby said first tube forms a discharge circuit for said second condenser, a connection from said second condenser to the grid of said second tube, whereby said second tube becomes conductive when the charge on said second condenser overcomes the cut-off value of said second tube, a direct connection between the cathodes of said first and third tubes, a direct connection between the anodes of said second and third tubes, a transformer having one winding connected between a source of anode polarizing potential and the anode of said third tube, and having another winding regeneratively coupled to the grid of said third tube, whereby said third tube and said transformer comprise a tripping oscillator, and a connection from said tripping oscillator to the grid of said first tube to supply to said last grid a voltage pulse of positive polarity of sufficient magnitude to cause said tube to conduct and thereby discharge said second condenser whenever said tripping oscillator is fired.

3. A counter circuit comprising a first condenser, a pair of rectifier structures each having a cathode and an anode, a direct connection from said condenser to the anode of one rectifier structure and the cathode of the other rectifier structure, a second condenser connected between the cathode of said one structure and ground, a direct connection from the anode of said other structure to ground, first, second and third triode vacuum tubes normally biased to cut-off, a direct connection from the anode of the first tube to the cathode of said one structure, a resistor shunted by a by-pass condenser connected between ground and the cathode of said first tube, whereby said first tube forms a discharge circuit for said second condenser, a resistor connecting the cathode of said first tube to a source of positive potential, a connection from said second condenser to the grid of said second tube, whereby said second tube becomes conductive when the charge on said second condenser overcomes the cut-off value on said second tube, a direct connection between the cathodes of said first and third tubes, a direct connection between the anodes of said second and third tubes, a transformer having one winding connected between a source of anode polarizing potential and the anode of said third tube, and having another winding regeneratively coupled to the grid of said third tube, whereby said third tube and said transformer comprise a tripping oscillator, and a connection from said tripping oscillator to the grid of said first tube to supply to said last grid a voltage pulse of positive polarity of sufficient magnitude to cause said first tube to conduct and thereby discharge said second condenser whenever said tripping oscillator is fired.

4. A counter circuit comprising a first condenser, a pair of rectifier structures each having an anode and a cathode, a direct connection from said condenser to the anode of one rectifier structure and the cathode of the other rectifier structure, a second condenser connected between the cathode of said one structure and ground, a direct connection from the anode of said other structure to ground, an electric tube having an anode connected over a direct current path to one side of said second condenser and a cathode connected through a resistor to the other side of said second condenser, a resistor connected between said cathode and the positive terminal of a source of unidirectional potential, and an electron discharge device circuit responsive to a predetermined magnitude of charge on said second condenser for rendering said electric tube conductive to thereby discharge said second condenser, means for applying recurring waves to said first condenser, whereby an incremental increase in voltage is developed across said second condenser for each input recurring wave during a cycle of operation of said counter, said means including an adjustable resistor arrangement for changing the amplitude of said recurring waves, and an output circuit coupled to said second condenser for deriving therefrom a step-wave voltage.

5. A counter circuit comprising a first condenser, a pair of rectifier structures each having a cathode and an anode, a direct connection from said condenser to the anode of one rectifier structure and the cathode of the other rectifier structure, a second condenser connected between the anode of said one structure and ground, a direct connection from the anode of said other structure to ground, first, second and third triode vacuum tubes normally biased to cut-off, a direct current connection from the anode of said first tube to one side of said second condenser, a connection including a series resistor from the cathode of said first tube to the other side of said second condenser, whereby said first tube forms a discharge circuit for said second condenser, another resistor connected between said cathode and the positive terminal of a source of unidirectional potential, a connection from said second condenser to the grid of said second tube, whereby said second tube becomes conductive when the charge on said second condenser overcomes the cut-off value on said second tube, a direct connection between the cathodes of said first and third tubes, a direct connection between the anodes of said second and third tubes, a transformer having one winding connected between a source of anode polarizing potential and the anode of said third tube, and having another winding regeneratively coupled to the grid of said third tube, whereby said third tube and said transformer comprise a tripping oscillator, and a connection from said tripping oscillator to the grid of said first tube to supply to said last grid a voltage pulse of positive polarity of sufficient magnitude to cause said first tube to conduct and thereby discharge said second condenser whenever said tripping oscillator is fixed.

6. A counter circuit comprising a first condenser, a pair of rectifier structures each having an anode and a cathode, a direct connection from said condenser to the anode of one rectifier structure and the cathode of the other rectifier structure, a second condenser connected between the cathode of said one structure and ground, a direct connection from the anode of said other structure to ground, an electric tube having an anode connected over a direct current path to one side of said second condenser and a cathode connected through a resistor to the other side of said second condenser, a resistor connected between said cathode and the positive terminal of a source of unidirectional potential, and an electron discharge device circuit responsive to a predetermined magnitude of charge on said second condenser for rendering said electric tube conductive to thereby discharge said second condenser, means for applying adjustable amplitude recurring waves to said first condenser, whereby an incremental increase in voltage is developed across said second condenser for each input recurring wave during a cycle of operation of said counter, said means including an adjustable resistor arrangement for changing the amplitude of said recurring waves, and an output circuit coupled to said second condenser for deriving therefrom a step-wave voltage.

WILLIAM D. HOUGHTON.

REFERENCES CITED

The following references are of record in the file of this patent:

UNITED STATES PATENTS

| Number | Name | Date |
|---|---|---|
| 2,113,011 | White | Apr. 5, 1938 |
| 2,411,573 | Holst | Nov. 26, 1946 |
| 2,413,440 | Farrington | Dec. 31, 1946 |
| 2,416,188 | McClellan | Feb. 18, 1947 |